Sept. 25, 1962 M. F. GRAHL ETAL 3,056,089
PEDESTAL-FREE GATED AMPLIFIER CIRCUIT
Filed May 26, 1961
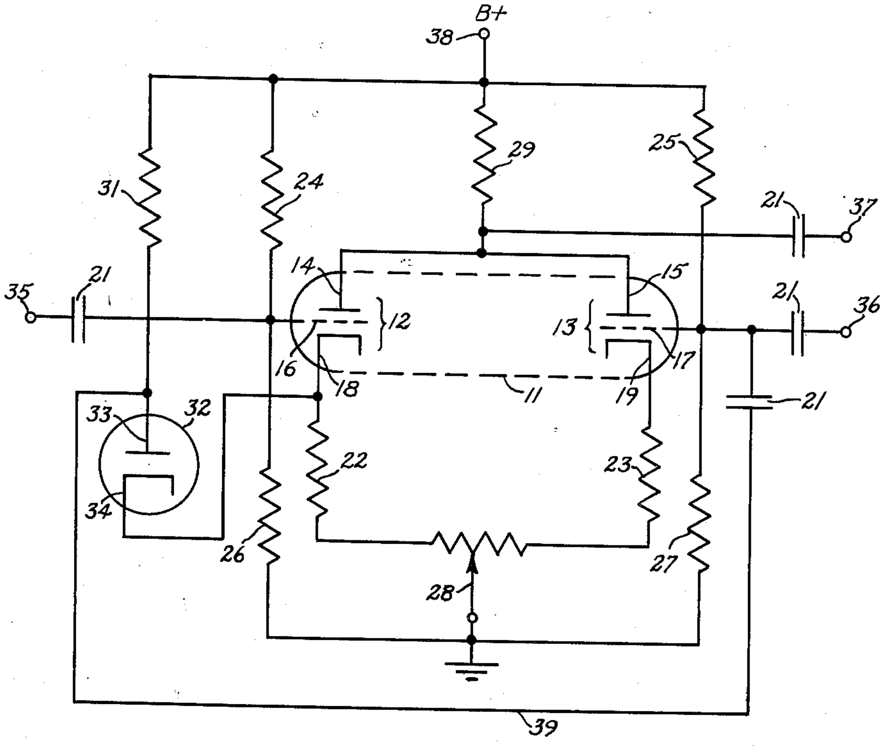
INVENTORS
DAVID CLARKE HARTIN
MELVIN FREDERICK GRAHL
BY
H. H. Losch
ATTORNEYS United States Patent Office 3,056,089
Patented Sept. 25, 1962

3,056,089

PEDESTAL-FREE GATED AMPLIFIER CIRCUIT

Melvin F. Grahl, Baltimore, and David C. Hartin, Glen Burnie, Md., assignors, by mesne assignments, to the United States of America as represented by the Secretary of the Navy Filed May 26, 1961, Ser. No. 113,047
9 Claims. (Cl. 328—99)

The present invention relates generally to improvements in electronic switching circuitry and the like and particularly to new and improved gating circuitry for use in both military and general electronics applications.

In many radar systems the modulation of the incoming or returning signal contains information regarding the range, azimuth, and elevation of the observed target. A system of gating this incoming signal in order to obtain desired information with regard to a particular range, et cetera, is often necessary. Such a gating system while performing its function of amplification and selection must not modify, add to, or subtract from the desired portion of the incoming signal, since any such modification would introduce erroneous data into the circuits which follow. This existing need for a gating amplifier circuit capable of supplying at its output a faithful reproduction of the "gated" portion of the incoming signal is satisfied by the present invention. Gating circuits of the prior art have modified the incoming signal by removing a necessary part of the leading and/or trailing edge or by adding an undesirable component such as a "plateau" or "pedestal" to the gated or passed waveform.

The present invention overcomes these disadvantages of the prior art by utilizing novel gating circuitry, preferably employing a twin triode amplifier tube (two independent identical triodes in a single envelope having balanced ambient operating conditions) with matched components, and having a single plate resistance permitting the level of direct current flowing in the anode circuit of this gating amplifier to remain constant as the incoming signal is alternately passed and blocked. This enables the invention to "gate" or pass the desired portions of the incoming signal with negligible modification or distortion, thereby eliminating the unwanted "plateaus" and/or "pedestals" normally made a part of the passed waveform by undesirable switching transients present in gating amplifiers of the prior art.

An object of the present invention is the provision of a system of gating for selection of desired information from an incoming signal.

Another object is to provide pulse amplifying electronic gating circuitry which upon receiving a gating signal will pass and amplify the selected portions of an incoming signal.

A further object of the invention is the provision of a gating circuit which upon receipt of a necessary gating pulse will amplify and gate a portion of an incoming signal with negligible distortion and without the addition of "plateaus" or "pedestals" to the gated waveform.

Still another object is to provide an electronic gating circuit in which undesirable switching transients are negligible.

The exact nature of this invention as well as other objects and advantages thereof will be readily apparent from consideration of the following specification relating to the annexed FIGURE of drawing which illustrates a schematic diagram of a preferred embodiment of the invention.

Referring now to the figure of drawing, element 11 is the envelope of a twin triode amplifier tube having identical triode sections 12 and 13, of which elements 14 and 15 are the respective anode electrodes, elements 16 and 17 are the grid electrodes, and elements 18 and 19 are the cathode electrodes; the various elements 21 are coupling capacitors. Cathodes 18 and 19 are coupled through resistances 22 and 23 respectively, which are of equal ohmic value, and balancing potentiometer 28 to ground; potentiometer 28 compensates for any variation or unbalance in the amounts of anode direct current flowing though triode sections 12 and 13, when each is respectively conducting, which might be caused by the tolerances and inequalities of the components utilized. Grids 16 and 17 are coupled through resistances 24 and 52 respectively, of equal ohmic value to a source of positive direct current 38, and through resistances 26 and 27 of equal ohmic value to ground, resistances 24 and 26 forming a voltage divider to supply a fixed bias voltage to grid 16, and resistances 25 and 27 also forming a voltage divider to supply a like bias voltage to grid 17. Load resistance 29 couples common anodes 14 and 15 to source 38, and resistance 31 couples anode 33 of diode 32 to source 38; diode 32 has its cathode 34 coupled to cathode 18 of triode 12. Input terminal 35 receives the incoming signal to be gated, and is capacitively coupled to grid 16 of triode 12; input terminal 36 receives the gating signals and is capacitively coupled to anode 33 of diode 32 via conductor 39 and to grid 17 of triode 13. Output terminal 37 is capacitively coupled to a point common to anodes 14 and 15 and supplies the gated and amplified output signal of the present invention to the following circuitry for utilization.

*Operation*

Assume that the invention has been placed in operation and is awaiting a gating pulse at terminal 36 from a suitable gating control source. An incoming or returning signal is being applied to input terminal 35 from a suitable signal source such as a radar receiving antenna circuit. It is desired that the present invention amplify and gate this incoming signal without modification or distortion of the gated portions, and supply these gated portions to output terminal 37.

In the absence of a negative gating signal at terminal 36 and with B+ power source 38 supplying a positive direct current potential to the invention, triode 13 will have a positive bias on grid 17 via voltage dividing resistances 25 and 27, and will thus be placed in a state of conduction. Triode 12 will have an equal positive bias applied to grid 16 through voltage dividing resistances 24 and 26; however, triode 12 will not conduct because of the current flowing from source 38 through resistance 31, diode 32, common cathode resistance 22, and balancing potentiometer 28 to ground. The ohmic values of resistances 31 and 22 are chosen in such a manner that this direct current flow therethrough will provide a positive potential of sufficient magnitude at cathode 18 to maintain triode 12 cut off, or in a state of nonconduction. Since triode 13 is conducting during this period of no gating pulse, the direct current potential at anode 15 will be lower than that normally present prior to conduction, thus common anode 14 will be at this same lower potential and tend to maintain triode 12 in its nonconducting condition. Thus it may be seen that under normal operating conditions with no gating pulse present on terminal 36, triode 13 and diode 32 will be in a state of conduction and triode 12 will remain cut off; the incoming signal applied to grid 16 via terminal 35 is thereby blocked and no output signal is provided at terminal 37.

When the negative gating pulse is applied to terminal 36, the potential on grid 17 instantaneously drops below its cutoff value and causes triode 13 to cease conduction; at the same instant, the negative gating pulse passes via conductor 39 to anode 33 of diode 32 thereby causing it to become reverse biased and also cease conduction, allowing the potential on cathode 18 of triode 12 to drop to approximately ground potential, thus permitting it to be placed in a state of conduction. Since twin triodes 12 and 13 have equal direct current potentials applied to their various electrodes during the period when each is respectively conducting, the amount of direct current flow therethrough for each conduction period will be equal for the two tubes, and thus the direct current flowing through common load resistance 29 at any instant will, for all practical purposes, remain constant. Potentiometer 28 will balance any D.C. anode current inequalities which may exist due to tolerances in components. The instant that triode 12 is placed in a state of conduction, the incoming signal present on its grid 16 will produce a varying component of anode current which will follow the modulation of the incoming signal and thereby provide an amplified and undistorted replica of the desired information present in the incoming signal to output terminal 37, without the addition of an unwanted plateau or pedestal to the output waveform which devices of the prior art have produced due to switching transients.

Upon cessation of the negative gating pulse, anode 33 of diode 32 again returns to a positive potential with respect to cathode 34 thus forward biasing diode 32 which immediately returns to a state of conduction, thereby providing a positive potential at cathode 18 sufficient to cut off triode 12 preventing any further passage to terminal 37 of the incoming modulated signal present on grid 16. Assuming equal switching times for twin triodes 12 and 13, triode 13 will begin conduction, due to the removal of negative cutoff potential on grid 17, at the same instant that triode 12 is cut off. Thus the circuit is returned to its normal standby condition to await the next negative gating pulse in order to begin another cycle. If for some reason the switching times of triodes 12 and 13 are not identical, separate gating pulses may be applied to diode 32, or compensating resistance-capacitance time constant circuitry may be placed around triodes 12 and/or 13 to enable them to effectively switch simultaneously. The only requirements for the negative gating pulses are (1) that they have reasonably sharp rise and fall times, (2) that they be of sufficient magnitude to assure cutoff of diode 32 and triode 13, and (3) that they be of proper frequency and sufficient duration to permit passage of the desired information in the incoming signal, from grid 16 of triode 12 to output terminal 37 during the gating period.

It can be seen from the preceding description of operation that the level of direct current passing through common anode resistance 29 remains at all times relatively constant regardless of whether the incoming signal present at terminal 35 is presently being passed or blocked. Therefore, the present invention introduces no appreciable distortion into the incoming waveform as gating triode 12 switches from nonconduction to conduction, as single triode gating circuits of the prior art have done, because the direct current flow through anode resistance 29 is already at the level of conduction of triode 12 due to the previous conduction of identical triode 13; thus the sharp rise in the direct current component of the anode current from zero to the conduction level, normally present as gating tubes of the prior art are gated from nonconduction to conduction, has been eliminated together with its attendant "pedestal" distortion-producing effect.

Thus it becomes apparent from the foregoing description and annexed drawing that the disclosed invention, a pedestal-free gated amplifier circuit, is a useful and practical device having many applications, both commercial and military, in the field of electronics.

Obviously many modifications and variations of the present invention are possible in the light of the above teachings. It is therefore to be understood that within the scope of the appended claims the invention may be practiced otherwise than as specifically described.

What is claimed is:

1. In a gating system a gated amplifier circuit comprising: a first terminal means for receiving an incoming signal to be amplified and gated; a first triode amplifying means coupled to said first terminal means; a second terminal means for receiving gating control signals; a second triode amplifying means coupled to said second terminal means; a source of direct current potential, said source being coupled through a common resistance to said first and second triode amplifying means; a diode control means, said diode control means having a first element coupled through a resistance to said source of direct current potential and through a capacitance to said second terminal means, and having a second element coupled to said first triode amplifying means to control the conduction therethrough; a current balancing means having one terminal thereof coupled to ground potential, a second terminal coupled to said first triode amplifying means, and a third terminal coupled to said second triode amplifying means, for balancing the levels of direct current with flow through said first and second triode amplifying means during their respective periods of conduction; and an output terminal means coupled to a terminal of said common resistance, for providing a gated and amplified output signal.

2. In a gating system, a gated amplifier circuit comprising: a first terminal means for receiving an incoming signal to be gated and amplified; first and second three-electrode gating and amplifying means, said first gating means being capacitively coupled to said first terminal means and having one of its electrodes coupled in common with a like electrode of said second gating means and through a common resistance to a source of direct current potential; a second terminal means for receiving gating control signals, said second terminal means being capacitively coupled to said second gating means; a diode conduction control means having anode and cathode control electrodes, said anode electrode being coupled through resistance means to said source of direct current potential and through a capacitance means to said second terminal means, and said cathode electrode being coupled to said first gating means to control the conduction thereof; a current balancing means having a first terminal coupled to ground potential and second and third terminals coupled respectively through resistance means to like electrodes of said first and second gating means to balance the direct currents flowing therethrough during their respective conduction cycles; and a third terminal means capacitively coupled to a terminal of said common resistance, for providing a gated and amplified output signal corresponding in time with each negative gating signal received by said second terminal means.

3. In a gating system, a gated amplifier circuit as in claim 2 wherein: said first and second three-electrode gating and amplifying means are triode electron tubes, each having anode, grid, and cathode electrodes, said grid electrode of said first gating means being capacitively coupled to said first terminal means for receiving an incoming signal to be gated, said anode electrodes of said first and second gating means being coupled through said common resistance to said source of direct current potential, said grid electrode of said second gating means being capacitively coupled to said second terminal means for receiving a gating signal, said cathode electrode of said first gating means being coupled to said cathode of said diode conduction control means, and said cathodes of said first and second gating means being coupled to said second and third terminals, respectively, of said current balancing means.

4. In a gating system, a gated amplifier circuit as in claim 3 wherein said current balancing means is a potentiometer having its movable arm coupled to ground potential and having its fixed resistance coupled in series with and between said cathodes of said first and second gating means.

5. In a system for selecting desired information from an incoming signal without introducing undesirable distortion, a gating amplifier circuit comprising: a first terminal means for receiving an incoming signal to be gated and amplified; first and second electron-conducting amplifying means each having emitting, collecting, and controlling electrodes, said first and second amplifying means having their collecting electrodes coupled in common and through a resistance to a source of direct current potential, said controlling electrode of said first amplifying means being capacitively coupled to said first terminal means and being further coupled through a first resistance to said source of direct current potential and through a second resistance to ground potential; a second terminal means for receiving a gating signal capacitively coupled to said controlling electrode of said second amplifying means which said controlling electrode is in turn coupled through a third resistance to said source of direct current potential and through a fourth resistance to ground potential; a three terminal current balancing means having its first terminal coupled to ground potential and having its second and third terminals coupled, respectively, through fifth and sixth resistance means to said emitting electrodes of said first and second amplifying means; a diode gating control means having first and second electron conducting elements, said first conducting element being resistively coupled to said source of direct current potential and capacitively coupled to said second terminal means for receiving a gating signal, and said second conducting element being coupled to said emitting electrode of said first amplifying means to control the conduction thereof; and an output terminal capacitively coupled to the common junction of said collecting electrodes to supply an amplified and gating output signal upon coincidence of proper input signals at said first and second terminal means.

6. In a system for selecting desired information from an incoming signal without introducing undesirable distortion, a gating circuit as in claim 5 wherein: said first and second electron-conducting amplifying means are separate and identical triode sections of a twin-triode electron tube in order that said triode sections will have similar ambient operating conditions and said emitting, collecting, and controlling electrodes are, respectively, cathode, anode, and grid electrodes; and said three terminal current balancing means contains a potentiometer having its movable contact coupled via said first terminal to ground potential and its fixed resistance coupled between said second and third terminals.

7. A gating circuit as in claim 6 wherein said first and third resistances are of equal ohmic value, said second and fourth resistances are of equal ohmic value, and said fifth and sixth resistances are of equal ohmic value in order that said triode sections will have equal operating potentials.

8. In a radar system, a gating circuit for selecting desired information from a returning signal without introducing undesirable distortion comprising: a twin-triode electron tube having first and second triode sections, said first triode section having first anode, first cathode, and first grid electrodes and said second triode section having second anode, second cathode, and second grid electrodes; a first input terminal means for receiving said returning signal capacitively coupled to said first grid electrode, said first grid electrode being further coupled through a first resistance to a source of direct current potential and through a second resistance to ground potential; said first and second anode electrodes coupled in common and through a load resistance to said source of direct current potential, and said second grid electrode capacitively coupled to a second input terminal for receiving a gating signal and through a third resistance to said source of direct current potential and through a fourth resistance to ground potential; a current balancing potentiometer, to equalize the flow of direct current through said first and second triode sections during their respective periods of conduction, having its movable contact coupled to ground potential, having one end of its fixed resistance coupled through a fifth resistance to said first cathode electrode, and having the other end of its fixed resistance coupled through a sixth resistance to said second cathode electrode; a diode conduction controlling element having anode and cathode conducting electrodes, said anode electrode being resistively coupled to said source of direct current potential and capacitively coupled to said second input terminal for receiving a gating signal, and said cathode electrode being coupled to said first cathode electrode of said first triode section to control the conduction of said first triode section; and an output terminal means capacitively coupled to the junction of said first and second anode electrodes for providing an output signal upon coincidence of said returning signal and said gating signal.

9. In a system for selecting desired information from an incoming signal without introducing undesirable distortion, a gating amplifier circuit comprising: a first terminal means for receiving an incoming signal to be gated and amplified; first and second electron-conducting amplifying means each having an emitting, controlling, and collecting electrode, said first and second amplifying means having their collecting electrodes coupled in common and through a resistance means to a source of direct current potential, said controlling electrode of said first amplifying means being capacitively coupled to said first terminal means and being further coupled through a first resistance to said source of direct current potential and through a second resistance to ground potential; a second terminal means for receiving a gating signal capacitively coupled to said controlling electrode of said second amplifying means which said controlling electrode is in turn coupled through a third resistance having an ohmic value equal to that of said first resistance to said source of direct current potential and through a fourth resistance having an ohmic value equal to that of said second resistance to ground potential; a current balancing potentiometer means having its movable contact coupled to ground potential and having its ends coupled, respectively, through fifth and sixth resistances of equal ohmic value to said emitting electrodes of said first and second amplifying means for balancing the direct current flow therethrough during their respective periods of conduction; a diode gating control means having anode and cathode electrodes, said anode electrode being resistively coupled to said source of direct current potential and capacitively coupled to said second terminal means for receiving a gating signal, and said cathode electrode being coupled to said emitting electrode of said first amplifying means to control the conduction thereof; and an output terminal capacitively coupled to the common junction of said collecting electrodes to supply an amplified and gated output signal upon coincidence of proper input signals at said first and second terminal means.

References Cited in the file of this patent

UNITED STATES PATENTS 2,943,260 Barnard ---------------- June 28, 1960